Aug. 17, 1965                R. A. BUTTKE                3,200,450
           APPARATUS FOR CASTING A POST STRAP AND WELDING SAME
                    TO THE PLATES OF A BATTERY STACK
Filed Nov. 24, 1961                                 8 Sheets-Sheet 1

FIG. 1

INVENTOR.
RICHARD A. BUTTKE
BY
John W. Michael
ATTORNEY

Aug. 17, 1965   R. A. BUTTKE   3,200,450
APPARATUS FOR CASTING A POST STRAP AND WELDING SAME
TO THE PLATES OF A BATTERY STACK
Filed Nov. 24, 1961   8 Sheets-Sheet 4

INVENTOR.
RICHARD A. BUTTKE
BY John W. Michael
ATTORNEY

INVENTOR.
RICHARD A. BUTTKE
BY
John W. Michael
ATTORNEY

FIG. 14

United States Patent Office 3,200,450
Patented Aug. 17, 1965

3,200,450
APPARATUS FOR CASTING A POST STRAP AND WELDING SAME TO THE PLATES OF A BATTERY STACK
Richard A. Buttke, Milwaukee, Wis., assignor to Globe-Union Inc., Milwaukee, Wis., a corporation of Delaware
Filed Nov. 24, 1961, Ser. No. 154,709
4 Claims. (Cl. 22—58)

This invention relates to a machine for fabricating elements for a storage battery and more particularly to a modification of the machine described and claimed in copending application Serial No. 79,728, filed December 30, 1960, and assigned to the assignee of this application. The modification covered by this application is designed specifically for fabricating a storage battery element of the type adapted for use in making a storage battery having intercell connections of the type disclosed in copending application Serial No. 132,660, filed August 21, 1961, and assigned to the assignee of this application.

The intercell connections of Serial No. 132,660 include vertically extending lugs on the element post straps having horizontally projecting portions thereon which extend through apertures in the partition walls of the battery case. Such projections are welded together and sealed in the aperture by the improved method described in Serial No. 132,660.

It is the object of this invention to provide a machine which will produce elements of the type described above, such machine having all the many advantages provided by the machine covered by application Serial No. 79,728.

Other objects and advantages will be pointed out in, or be apparent from, the specification and claims, as will obvious modifications of the single embodiment shown in the drawings, in which:

Figure 11:
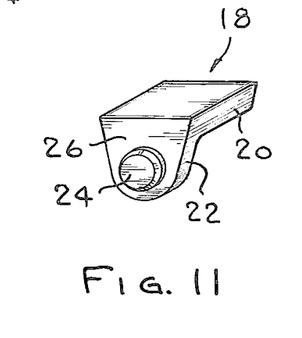
FIG. 11 is a perspective view of a post strap of the type which this machine is adapted to make.

The apparatus of this invention is part of an overall machine designed for fabricating storage battery elements 10 (FIG. 2) comprised of negative and positive plates 12 and 14 alternately arranged between suitable separators (not shown). The plates have lugs 16 thereon, to which post straps 18 (FIG. 11) are welded to form a complete element. The assembled plates and separators prior to welding of a post strap thereto is shown in FIG. 3 and is called a "stack." As shown in FIG. 11, strap 18 includes a horizontal strap portion 20 provided with an upstanding connector lug 22 having a projection 24 extending horizontally from a flat sealing face 26 thereon. For a detailed discusison of the significance of this connector lug and projection construction see application Serial No. 132,660. The connector lugs 22 and projections 24 are cast integrally with straps 20 and are welded to the plates 12 and 14 by the apparatus of this invention.

Application Serial No. 79,728 describes a complete machine for manufacturing battery elements which includes a stack transferring mechanism having a transfer head 28 (FIGS. 2 and 3) adapted to transfer a stack between a load and alignment station, a flux and preheat station, a casting station and an unload station. This application is concerned only with the apparatus at the casting station and thus only such apparatus is shown in the drawings and described herein. The remaining apparatus at the other stations of the machine is described in detail in application Serial No. 79,728, and such remaining apparatus can be used with that of the present invention to fabricate battery elements having post straps of the type shown in FIG. 11.

The equipment located at the casting station of the overall machine includes a lead supply apparatus (not shown) and a casting apparatus such as that shown in the drawings and described hereinafter.

The casting apparatus is mounted on suitable frame members 30 (FIG. 14) and includes a pair of casting pots 32, movably mounted on cross supports 34 by actuating arms 36 and stabilizing links 38. Arms 36 are actuated to move pots 32 between a pouring position (FIG. 3) and a retracted position (FIG. 2) by suitable power cylinders (not shown) operatively connected to the lower ends of arms 36.

Figure 2:
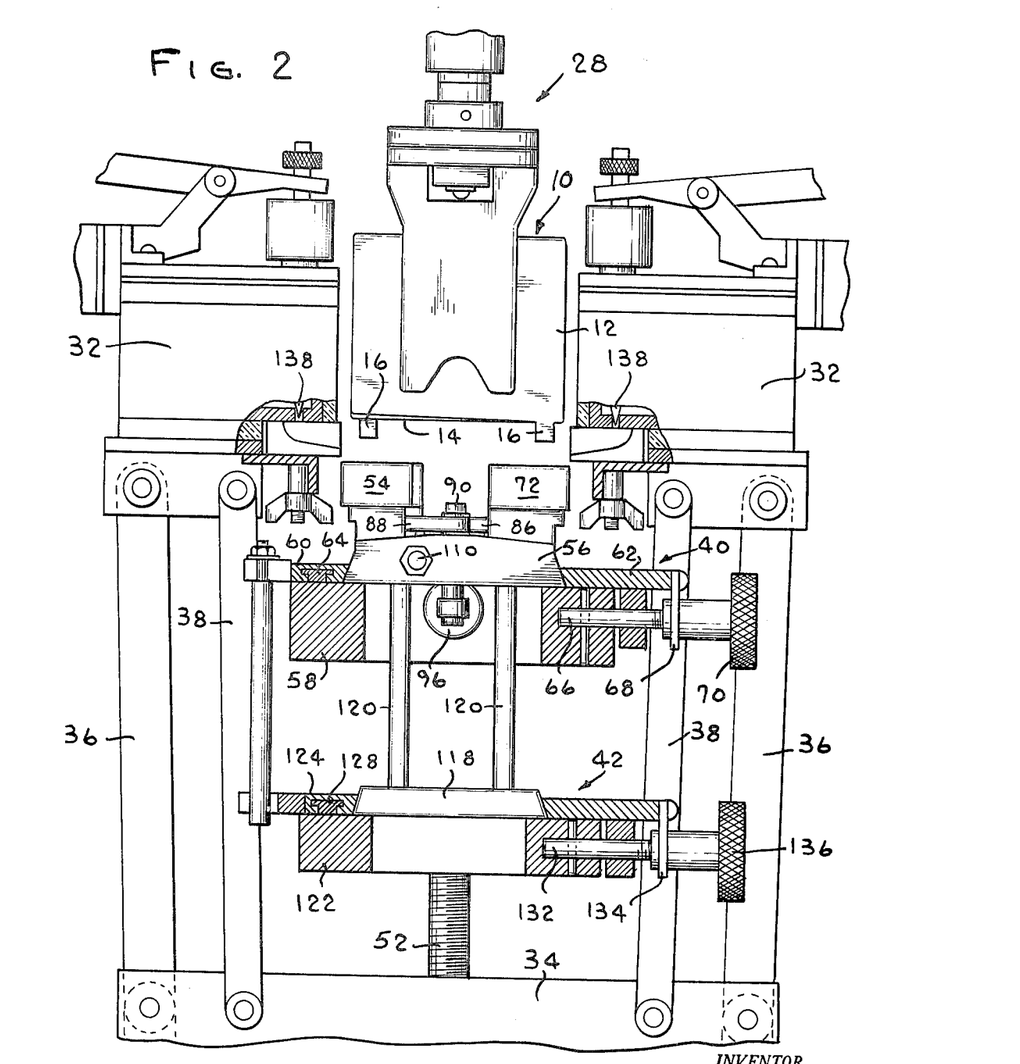
FIG. 2 is a sectional view taken along line 2—2 of FIG. 1 showing the casting pots in retracted position.
Figure 3:
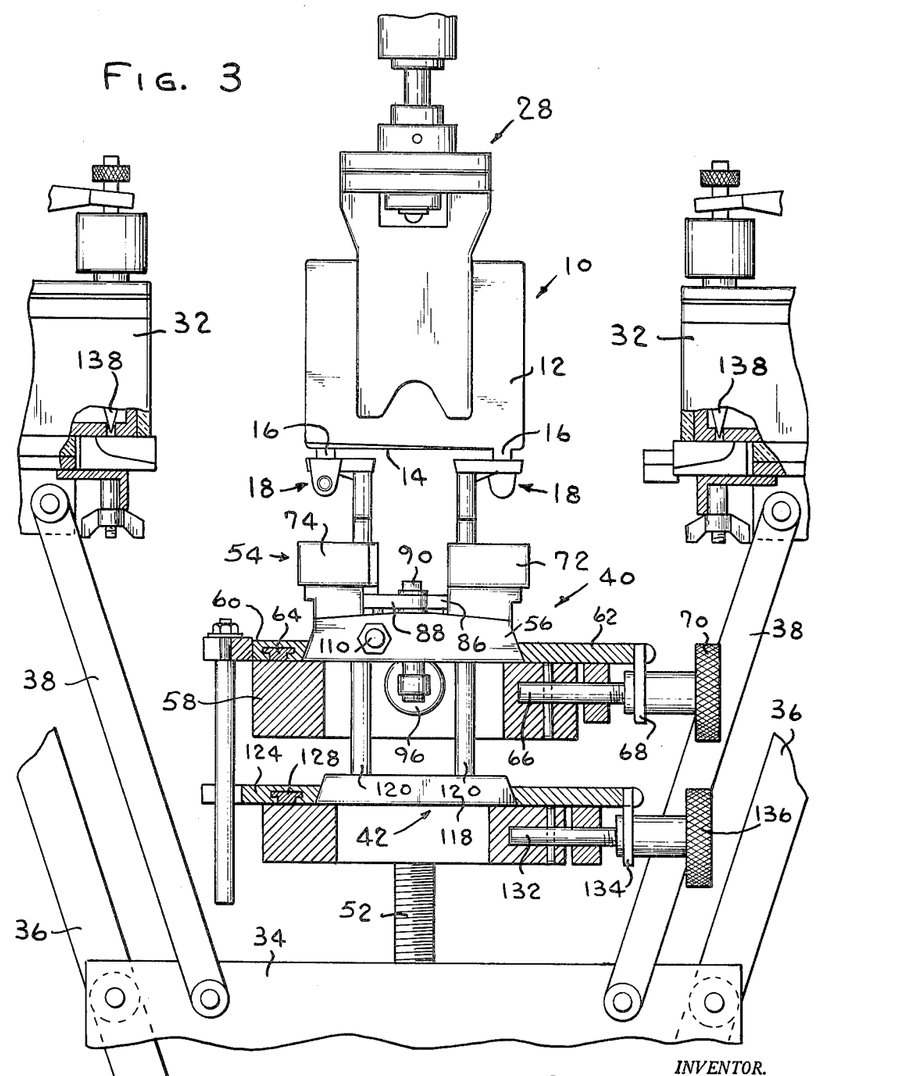
FIG. 3 is a view similar to FIG. 2 except with the casting pots in pouring position.
Figure 14:
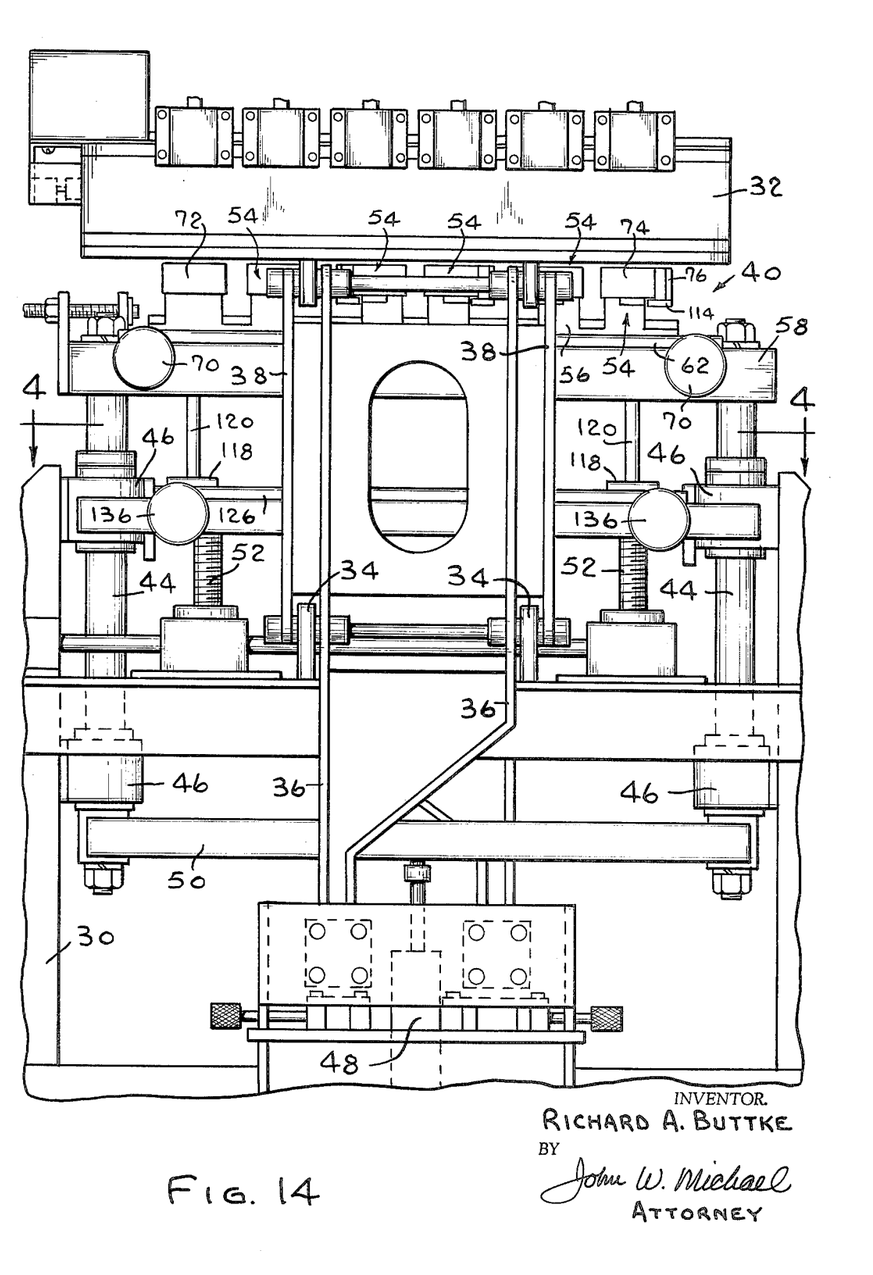
FIG. 14 is a side elevation view of the casting apparatus covered by this application.

A mold assembly 40 and a knockout pin assembly 42 are mounted on the central portion of frame 30 between casting pots 32 as shown in FIGS. 2 and 3. Mold assembly 40 is mounted for vertical movement above and with respect to the knockout pin assembly by posts 44 slidably mounted in bearing blocks 46 fastened to the frame 30 (FIG. 14). The mold assembly is raised and lowered on the frame (relative to the knockout pin assembly) by a lift cylinder 48 (FIG. 14) mounted on the frame and operatively connected to a horizontal support member 50 fastened between posts 44.

The knockout pin assembly 42 can be manually adjusted vertically on the frame by means of threaded posts 52 on which the knockout pin assembly is mounted.

Mold assembly 40 (FIGS. 1, 2, 3, 5–13) includes a plurality of spaced two-piece mold blocks 54 mounted on a mold support bed 56 which in turn is supported on a mold support member 58 and clamped thereon between bars 60 and 62. Mold support bed 56 is clamped firmly against bar 60 (which is keyed to support member 58 by a key-way 64) by a pair of threaded pins 66 which are pinned to support member 58 and pass through retainer plates 68 on bar 62 so that the support bed can be clamped in place by knobs 70 threaded on the ends of pins 66.

Figure 6:
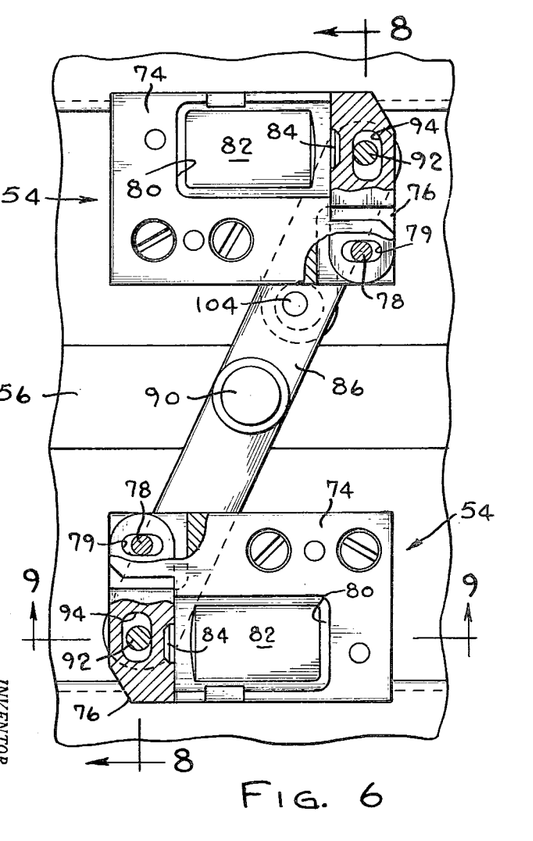
FIGS. 6 and 7 are enlarged fragmentary plan views of the mold block assembly showing the molds in closed and open position.
Figure 7:
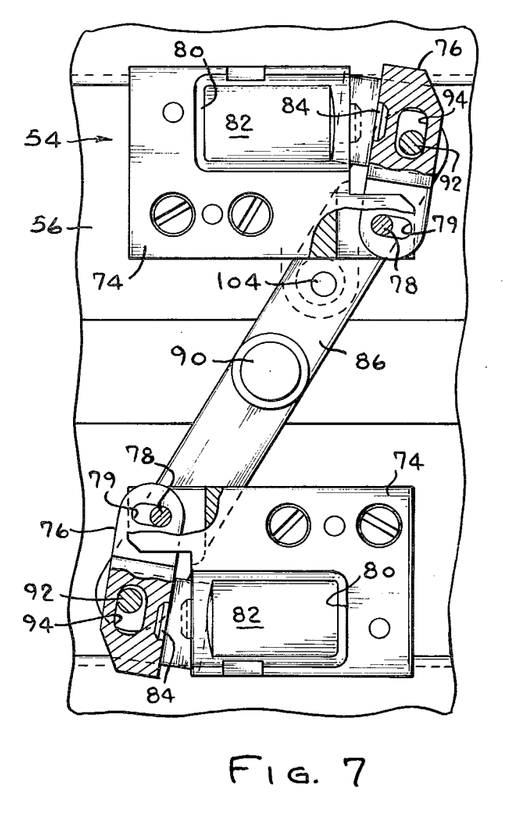

With the exception of the two end mold blocks 72 in which the terminal post straps are cast, each mold block 54 (FIG. 9) includes a main body portion 74 and a hinged gate portion 76 pivotally mounted on the main body portion by pins 78 mounted in elongated openings 79 (FIGS. 6 and 7). As shown clearly in FIG. 9 a post strap of the type shown in FIG. 11 is cast by pouring molten lead through opening 80 in main body 74. The horizontal strap portion 20 and upstanding connector lug 22 are cast in cavity 82 of main body portion 74 of the mold and the horizontally extending projection 24 on lug 22 is cast in cavity 84 of hinged gate portion 76 of the mold, the two parts of the mold together forming a single mold cavity to produce a one-piece post strap 18 (FIG. 11).

It will be appreciated at this point that since horizontal projection 24 extends in a different plane than does strap portion 20, there is a problem in removing the cast post strap from the mold. The solution to this problem resides in a means for producing relative movement between the two parts 74 and 76 of the mold so that after the casting 18 has hardened the mold can be opened up to permit removal of the casting therefrom. More specifically, hinged gate portion 76 of the mold is pivoted to open the mold by a suitable actuator means which, in the preferred embodiment, includes a plurality of actuating arms 86 and 88 pivotally mounted on bed 56 by pins 90 and operatively connected to hinged mold gates 76 by pins 92 fastened to arms 86, 88 and extending upwardly into elongated openings 94 in gates 76. As clearly shown in FIG. 1, each arm 86 is adapted to open and close a pair of molds 54 mounted on opposite sides of bed 56 while the end arms 88 operate only a single mold.

Figure 8:
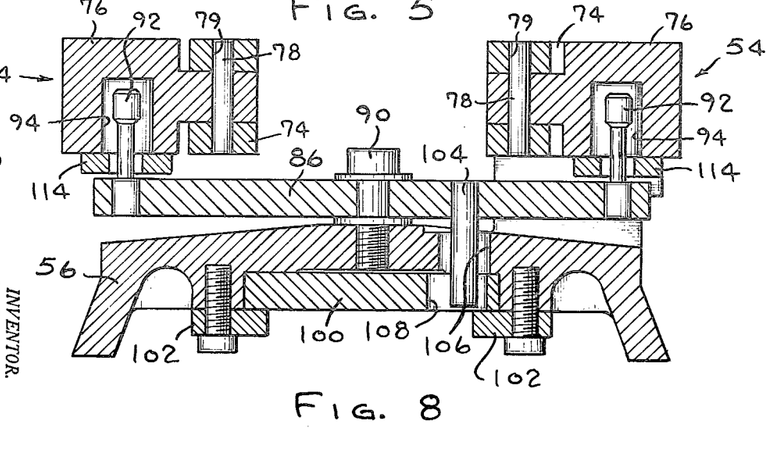
FIG. 8 is a sectional view taken along line 8—8 of of FIG. 6.

Arms 86, 88 are actuated simultaneously by means of a power cylinder 96 (FIG. 5) mounted underneath bed 56. Cylinder 96 is fixed at one end to bed 56 by a plate 98 and is fastened at the other end to a slider plate 100 supported beneath bed 56 by bars 102. Slider plate 98 is in turn operatively connected to arms 86, 88 by means of pins 104 fixed in the arms and extending downwardly through openings 106 in bed 56 for register in openings 108 in slider 98 (FIG. 8).

Figure 5:
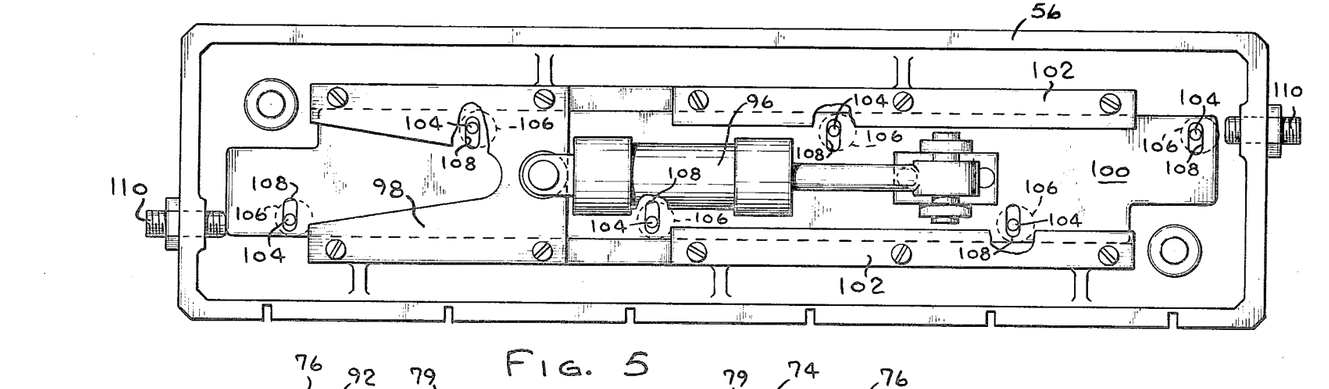
FIG. 5 is a bottom plan view of the mold block assembly of the machine.

Thus, it is seen that when cylinder 96 is energized first in one direction and then in the other, slider 100 is actuated back and forth to pivot arms 86, 88 which in turn pivot mold gates 76 to open and close the molds and thereby permit withdrawal of the cast post straps upwardly from the molds. As shown in FIG. 7, when gates 76 are opened the projection 24 (shown in dotted lines) of the post strap is completely exposed to allow withdrawal of the casting from the mold block. The travel limits of slider plate 100 can be adjusted by means of stop screws 110 mounted at each end of the slider as shown in FIG. 5.

Figures 4, 9, 10:
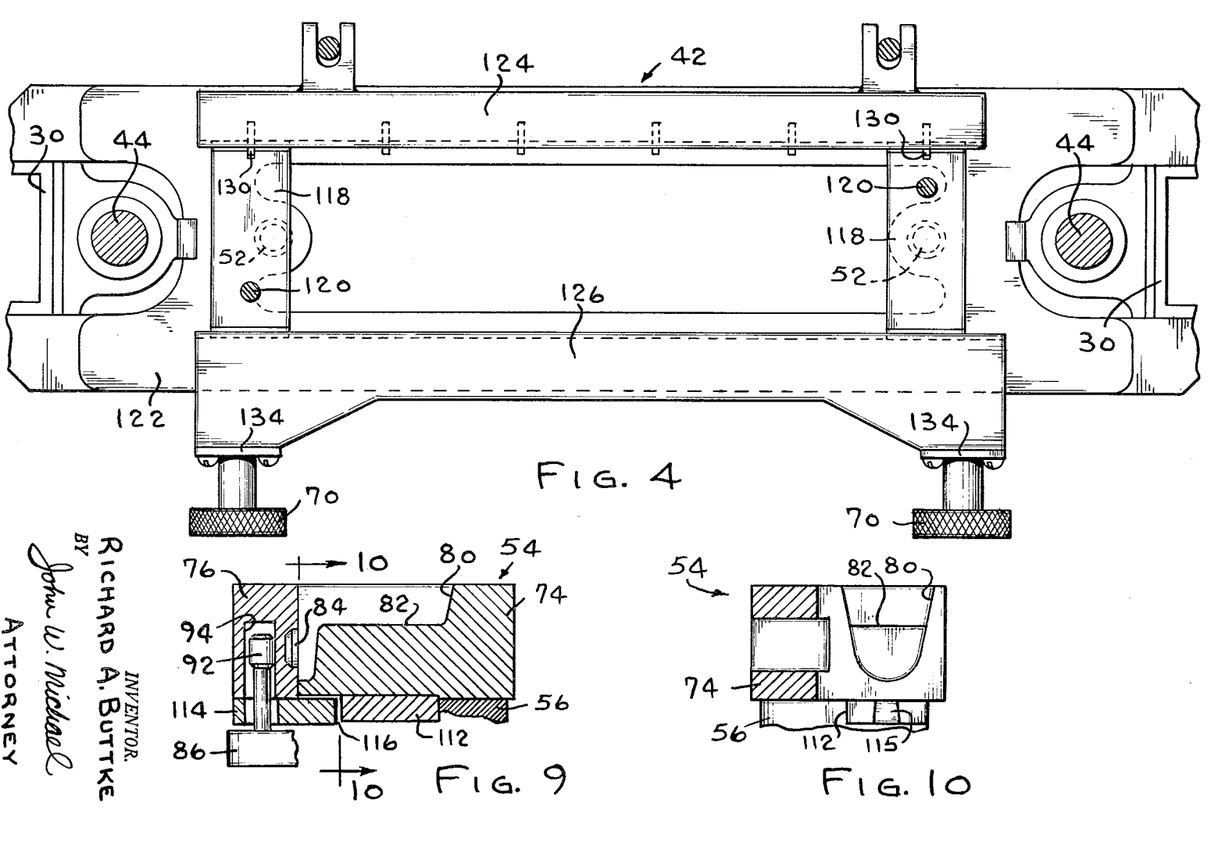
FIG. 4 is a fragmentary sectional view taken along line 4—4 of FIG. 14.
FIG. 9 is a sectional view taken along line 9—9 of FIG. 6.
FIG. 10 is a sectional view taken along line 10—10 of FIG. 9.
Figure 12:
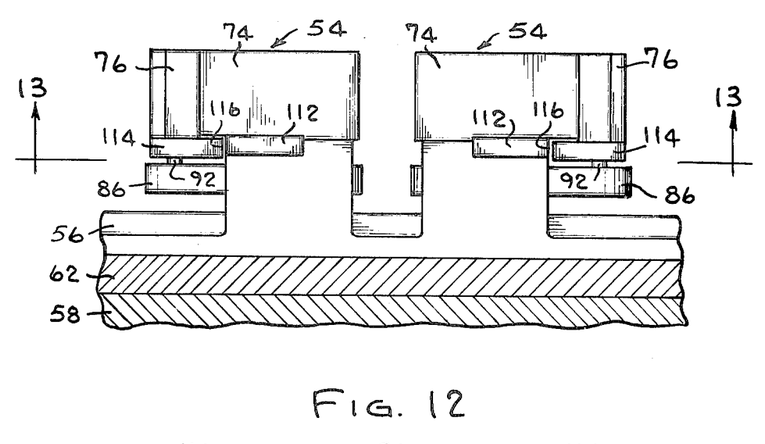
FIG. 12 is a partial sectional view taken along line 12—12 of FIG. 1.
Figure 13:
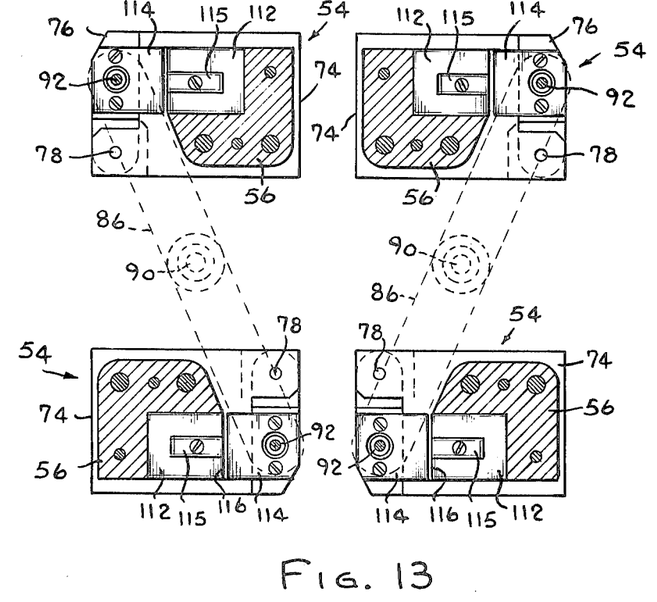
FIG. 13 is a sectional view taken along line 13—13 of FIG. 12.

To aid in closing the molds and to insure complete closing thereof, each mold is provided with a permanent magnet 112 and an armature 114 mounted on mold body 74 and gate 76, respectively, as shown in FIGS. 12 and 13. Magnets 112 are substantially U-shaped and are mounted on the bottom of body portions 74 by means of bar 115 having tapered sides as shown in FIG. 10. The magnet 112 and armature 114 are positioned so that when the molds are closed there is only a small air gap 116 therebetween to produce a strong magnetic attraction between the two parts. Such magnetic attraction force serves to aid in closing the molds to insure complete closing thereof upon each operation. It has been found that by making mold parts 74 and 76 of a suitable non-magnetic material such as aluminum the magnetic force produced between magnets 112 and armatures 114 is increased.

The knockout pin assembly 42 (FIGS. 2, 3 and 4) includes a pair of knockout blocks 118 (each having a knockout pin 120) mounted on a knockout pin support member 122 and clamped thereon between bars 124 and 126. Bar 124 is keyed to support 122 by a key-way 128. Blocks 118 are pinned to bar 124 by pins 130 (FIG. 4) to properly space the blocks and knockout pins 120 beneath the two end mold blocks in which the two terminal post straps are cast.

The knockout pin blocks 118 are clamped firmly between bars 124, 126 by a pair of threaded pins 132 which are pinned to support member 122 and pass through retainer plates 134 on bar 126 so that the blocks 118 can be tightened in place by knobs 136 threaded on the ends of pins 132 (FIGS. 2 and 3).

Each casting pot 32 is provided with a bank of six solenoid operated valves 138 which are adapted to control the flow of molten lead from pots 32 into molds 54 and 72.

Figure 1:
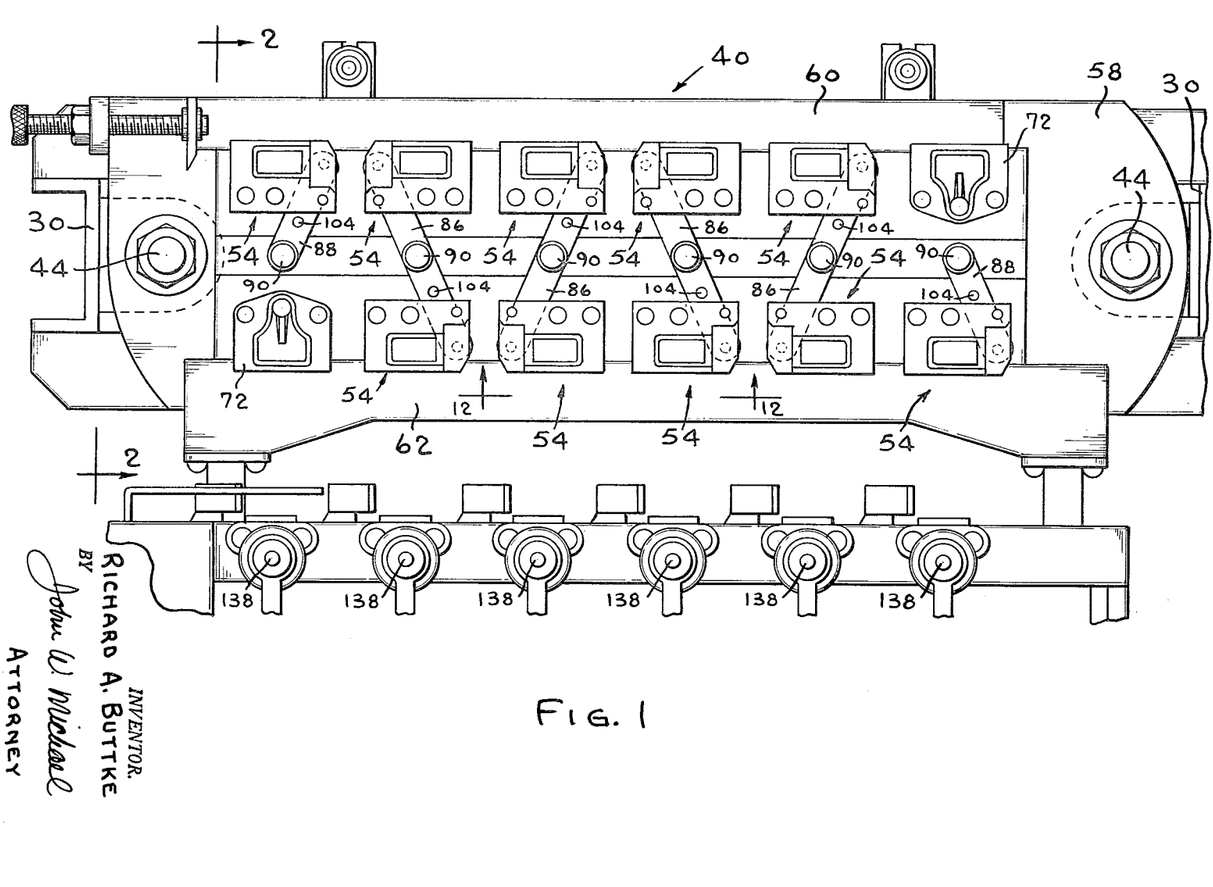
FIG. 1 is a fragmentary plan view of the casting apparatus of this invention.

When a stack is indexed to the casting station of the machine, casting pots 32 are in the retracted position (FIG. 2) and the molds 54 are closed (FIG. 1). After the stacks reach the casting station, the casting pots are pivoted to pouring position (FIG. 3). The molds are then poured by opening valves 138 for a specified period of time to allow a metered amount of molten lead to flow from the pots into the molds. As the pouring of the molds is about completed the transfer head 28 is lowered causing lugs 16 on plates 12, 14 to be dipped into the molten lead in mold cavities 82 to thereby weld the plates to the post straps which have just been cast.

The post straps are allowed to harden in the molds and then the molds are opened by energizing cylinder 96 which will slide plate 100 causing arms 86, 88 to pivot gates 76 from a closed position (FIG. 6) to open position (FIG. 7). Immediately thereafter the entire mold assembly 40 is lowered by cylinder 48 to the position shown in FIG. 2. Such lowering of assembly 40 will cause post straps 18 to be pulled out of molds 54 and will also cause knockout pins 120 to force the terminal post straps out of molds 72. The completed elements 10 (FIG. 3) are then raised by the transfer head, pots 32 are retracted, molds 54 are closed, and the elements are indexed to the next station for unloading from the machine.

Although but one embodiment of the present invention has been illustrated and described, it will be apparent to those skilled in the art that various changes and modifications may be made therein without departing from the spirit of the invention or from the scope of the appended claims.

I claim:

1. Apparatus for casting a post strap and welding same to the plates of a battery stack comprising:
    a mold assembly including a plurality of mold boxes each including a main body and a movable gate, said main mold body and movable gate each having a cavity therein which together form a single cavity for casting a post strap, said main body and movable gate being arranged side-by-side with said gate mounted for movement in a horizontal plane with respect to said main body for movement between a closed and an open position, both said main body and movable gate movably mounted to be lowered together as a unit in a vertical plane;
    pouring means positioned above said mold boxes for pouring a metered amount of molten metal into said single cavity of each of said mold boxes;
    mold actuator means operatively connected to said movable gates to produce relative horizontal movement between said main body and gate of each mold box to move the parts to open position and a means to subsequently lower said mold boxes in a vertical plane with said mold boxes in open position to thereby facilitate removal of castings from said mold boxes, said mold actuator means including a slider plate and a plurality of pivotally mounted arms, said arms operatively connected to said gates so that when said arms are pivoted said gates will be moved with respect to said main body, said slider plate being operatively connected to said arms so that as said plate is actuated said arms will be pivoted to move said gates; and
    fixed support means passing through the bottom of said mold boxes, said fixed support means positioned to hold said straps and plates stationary when said mold boxes are lowerd by said mold actuator means.

2. Apparatus for casting a post strap and welding same to the plates of a battery stack wherein said post strap is comprised of a horizontal strap portion having an upstanding connector lug thereon which in turn is provided with a projection thereon;
    a mold assembly including a plurality of mold boxes each including a main body and a hinged gate, said mold body and hinged gate each having a cavity therein which together form a single cavity for casting a post strap, the cavity in said mold body being adapted to cast the horizontal strap portion and connector lug of said post strap and said hinged gate adapted to cast the projection on the connector lug, said main body having a pouring opening therein and being positioned for pouring a post strap with the face of the horizontal strap portion thereof to which the plate lugs are welded lying flush with said pouring opening of said main body;

pouring means positioned above said mold boxes for pouring a metered amount of molten metal into the pouring opening of each of said mold boxes; and mold actuator means operatively connected to said movable gates to produce relative movement between said body and gate of each mold box to thereby facilitate removal of castings from said mold boxes, said mold actuator means including a slider plate and a plurality of pivotally mounted arms, said arms operatively connected to said gates so that when said arms are pivoted said gates will be moved with respect to said main body, said slider plate being operatively connected to said arms so that as said plate is actuated said arms will be pivoted to move said gates.

3. Apparatus for casting a post strap and welding same to the plates of a battery stack comprising:

a mold assembly including a plurality of mold boxes each including a main body and a movable gate, said main mold body and movable gate each having a cavity therein which together form a single cavity for casting a post strap, said main body and movable gate being arranged side-by-side with said gate mounted for movemnt in a horizontal plane with respect to said main body for movement between a closed and an open position, both said main body and movable gate movably mounted to be lowered together as a unit in a vertical plane;

pouring means positioned above said mold boxes for pouring a metered amount of molten metal into said single cavity of each of said mold boxes;

mold actuator means operatively connected to said movable gates to produce relative horizontal movement between said main body and gate of each mold box to move the parts to open position and a means to subsequently lower said mold boxes in a vertical plane with said mold boxes in open position to thereby facilitate removal of castings from said mold boxes; and fixed support means passing through the bottom of said mold boxes, said fixed support means positioned to hold said straps and plates stationary when said mold boxes are lowered by said mold actuator means.

4. Apparatus for casting a post strap and welding same to the plates of a battery stack comprising;

a mold assembly including a plurality of mold boxes each including a main body and a movable gate, said main mold body and movable gate each having a cavity therein which together form a single cavity for casting a post strap, said main body and movable gate being arranged side-by-side with said gate mounted for movement in a horizontal plane with respect to said main body for movement between a closed and an open position, both said main body and movable gate movably mounted to be lowered together as a unit in a vertical plane;

pouring means positioned above said mold boxes for pouring a metered amount of molten metal into said single cavity of each of said mold boxes; and mold actuator means operatively connected to said movable gates to produce relative horizontal movement between said main body and gate of each mold box to move the parts to open position and a means to subsequently lower said mold boxes in a vertical plane with said mold boxes in open position to thereby facilitate removal of castings from said mold boxes.

References Cited by the Examiner
UNITED STATES PATENTS

| 30,054 | 9/60 | Evans | 22—150 |
|---|---|---|---|
| 833,010 | 10/06 | Thomas et al. | 25—41.4 |
| 1,883,335 | 10/32 | Braden | 22—203 XR |
| 2,589,442 | 3/52 | Siegrist | 22—58 XR |
| 2,727,287 | 12/55 | Land | 22—58 |
| 3,049,759 | 8/62 | Eberhardt. | |

WILLIAM J. STEPHENSON, *Primary Examiner.*

WINSTON A. DOUGLAS, ROBERT F. WHITE,
*Examiners.*